(12) United States Patent
Mao et al.

(10) Patent No.: US 10,050,554 B2
(45) Date of Patent: Aug. 14, 2018

(54) METHOD AND DEVICE FOR CONTROLLING VIENNA-LIKE THREE-LEVEL CIRCUIT

(71) Applicant: Emerson Network Power Co., Ltd., Shenzhen, Guangdong (CN)

(72) Inventors: Yunhe Mao, Guangdong (CN); Zhixian Wu, Guangdong (CN); Jian Li, Guangdong (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 0 days.

(21) Appl. No.: 15/363,146

(22) Filed: Nov. 29, 2016

(65) Prior Publication Data
US 2017/0155338 A1 Jun. 1, 2017

(30) Foreign Application Priority Data
Dec. 1, 2015 (CN) .......................... 2015 1 0865775

(51) Int. Cl.
*H02M 7/217* (2006.01)
*H02M 1/00* (2006.01)

(52) U.S. Cl.
CPC .... *H02M 7/217* (2013.01); *H02M 2001/0058* (2013.01)

(58) Field of Classification Search
CPC ........... H02M 2001/0058; H02M 1/42; H02M 7/217; H02M 3/156; H02M 3/158; H02M 3/1588
See application file for complete search history.

(56) References Cited

U.S. PATENT DOCUMENTS

2012/0175958 A1* 7/2012 Dighrasker ............. H02J 9/062
  307/66
2014/0043004 A1 2/2014 Abramov

OTHER PUBLICATIONS

Bhardwaj, Manish. (Nov. 2016). Vienna Rectifier-Based, Three-Phase Power Factor Correction (PFC) Reference Design Using C2000™ MCU.*
European Search Report regarding Application No. 16201261.1, dated Mar. 31, 2017.
Kumar, M J Krishna et al: "Comparison of 3-Phase, 3-Level UPF Rectifier Circuits for Higher Power Applications," Power Electronics, Drives and Energy Systems (PEDES), 2012 IEEE International Conference on, IEEE, Dec. 16, 2012, pp. 1-6.

* cited by examiner

*Primary Examiner* — Gary L Laxton
*Assistant Examiner* — Peter Novak
(74) *Attorney, Agent, or Firm* — Harness, Dickey & Pierce, P.L.C.

(57) ABSTRACT

A method and a device for controlling a Vienna-like three-level circuit are provided. The method includes: detecting an inductor current of an inductor connected to each operating high-frequency bridge arm in the Vienna-like three-level circuit during a positive half cycle of an AC input voltage; and in a case that a freewheeling switch transistor on the high-frequency bridge arm to which the inductor is connected is in an on state, and a main switch transistor is in an off state, controlling the freewheeling switch transistor to maintain in the on state and the main switch transistor to maintain in the off state if the detected inductor current does not reach a preset negative current, and controlling the freewheeling switch transistor to be turned off and the main switch transistor to be turned on if the detected inductor current reaches the preset negative current.

8 Claims, 21 Drawing Sheets detect an inductor current of an inductor connected to each operating high-frequency bridge arm in the Vienna-like three-level circuit during a positive half cycle of an AC input voltage of the Vienna-like three-level circuit ~ 201 when an instantaneous value of the AC input voltage of the Vienna-like three-level circuit is greater than or equal to half of a DC output voltage of the Vienna-like three-level circuit, and when a freewheeling switch transistor on the high-frequency bridge arm to which the inductor is connected is in an on state, and when a main switch transistor on the high-frequency bridge arm is in an off state, control the freewheeling switch transistor in the on state to maintain in the on state and the main switch transistor in the off state to maintain in the off state if the detected inductor current does not reach a preset negative current, and control the freewheeling switch transistor in the on state to be turned off and the main switch transistor in the off state to be turned on if the detected inductor current reaches the preset negative current ~ 202

Figure 2 detect an inductor current of an inductor connected to each operating high-frequency bridge arm in the Vienna-like three-level circuit during a negative half cycle of an AC input voltage of the Vienna-like three-level circuit ~301 when an instantaneous value of the AC input voltage of the Vienna-like three-level circuit is greater than or equal to half of a DC output voltage of the Vienna-like three-level circuit, and when a freewheeling switch transistor on the high-frequency bridge arm to which the inductor is connected is in an on state, and when a main switch transistor on the high-frequency bridge arm is in an off state, control the freewheeling switch transistor in the on state to maintain in the on state and the main switch transistor in the off state to maintain in the off state if the detected inductor current does not reach a preset positive current, and control the freewheeling switch transistor in the on state to be turned off and the main switch transistor in the off state to be turned on if the detected inductor current reaches the preset positive current ~302

METHOD AND DEVICE FOR CONTROLLING VIENNA-LIKE THREE-LEVEL CIRCUIT

CROSS-REFERENCE TO RELATED APPLICATIONS

This application claims the benefit and priority of Chinese Application No. 201510865775.X, filed on Dec. 1, 2015, the entire disclosure of which is incorporated herein by reference.

FIELD

The disclosure relates to the field of power electronic technology, and in particular to a method and a device for controlling a Vienna-like three-level circuit.

BACKGROUND

At present, various three-level circuits are widely used in many fields due to their advantage of high efficiency. A common Vienna-like three-level circuit is shown in FIG. 1, which includes switch transistors Q1 and Q2 which constitute a power-frequency bridge arm, switch transistors S1 and S3 which constitute a first high-frequency bridge arm, switch transistors S2 and S4 which constitute a second high-frequency bridge arm, inductors L1 and L2, and bus capacitors Co+ and Co−, where the first high-frequency bridge arm and the second high-frequency bridge arm are connected in series to form a branch, where two terminals of the branch are DC output terminals of the Vienna-like three-level circuit; a connection node between the first high-frequency bridge arm and the second high-frequency bridge arm and a middle point of the power-frequency bridge arm are AC input terminals of the Vienna-like three-level circuit; one terminal of the power-frequency bridge arm is connected to a middle point of the first high-frequency bridge arm via the inductor L1, and the other terminal of the power-frequency bridge arm is connected to a middle point of the second high-frequency bridge arm via the inductor L2; and the bus capacitor Co+ is connected in parallel between two terminals of the first high-frequency bridge arm, and the bus capacitor Co− is connected in parallel between two terminals of the second high-frequency bridge arm. Specifically, The switch transistors Q1 and Q2 may be uncontrolled transistors, half-controlled thyristors, or fully-controlled MOS transistors or IGBTs, switch transistors S1, S2, S2 and S4 are fully-controlled MOS transistors or IGBTs, diodes D1, D2, D3 and D4 are body diodes or external anti-parallel connected diodes of the switch transistors S1, S2, S3 and S4 respectively, and capacitors Coss1, Coss2, Coss3 and Coss4 are equivalent junction capacitors of the switch transistors S1, S2, S3 and S4 respectively.

In the Vienna-like three-level circuit shown in FIG. 1, during a positive half cycle of an AC input voltage Vin, a switch transistor Q1 is in an on state, a first high-frequency bridge arm is in an operation state, a switch transistor S3 is the main switch transistor, and a switch transistor S1 is the freewheeling switch transistor; during a negative half cycle of the AC input voltage Vin, a switch transistor Q2 is in an on state, a second high-frequency bridge arm is in an operation state, a switch transistor S2 is the main switch transistor, and a switch transistor S4 is the freewheeling switch transistor.

In the conventional technology, a commonly used method for controlling the Vienna-like three-level circuit is an inductor current continuous conduction mode control method such as the CRM (Critical Conduction Mode) control method. However, a zero-voltage turning on of the high-frequency bridge arm switch transistor cannot be achieved with this control method, thereby resulting in high circuit loss.

SUMMARY

A method and a device for controlling a Vienna-like three-level circuit are provided according to the embodiments of the disclosure in order to solve the technical issue of the conventional technology that it is impossible to achieve the zero-voltage turning on of the high-frequency bridge arm.

A method for controlling a Vienna-like three-level circuit is provided according to the embodiments of the disclosure, where the method includes:

detecting an inductor current of an inductor connected to each operating high-frequency bridge arm in the Vienna-like three-level circuit during a positive half cycle of an AC input voltage of the Vienna-like three-level circuit; and in a case that a freewheeling switch transistor on the high-frequency bridge arm to which the inductor is connected is in an on state, and a main switch transistor on the high-frequency bridge arm is in an off state, controlling the freewheeling switch transistor in the on state to maintain in the on state and the main switch transistor in the off state to maintain in the off state if the detected inductor current does not reach a preset negative current, and controlling the freewheeling switch transistor in the on state to be turned off and the main switch transistor in the off state to be turned on if the detected inductor current reaches the preset negative current.

Optionally, before the controlling the freewheeling switch transistor in the on state to maintain in the on state and the main switch transistor in the off state to maintain in the off state, the method may further include:

determining that an instantaneous value of the AC input voltage of the Vienna-like three-level circuit is greater than or equal to a half of a DC output voltage of the Vienna-like three-level circuit.

A method for controlling a Vienna-like three-level circuit is provided according to the embodiments of the disclosure, where the method includes:

detecting an inductor current of an inductor connected to each operating high-frequency bridge arm in the Vienna-like three-level circuit during a negative half cycle of an AC input voltage of the Vienna-like three-level circuit; and in a case that a freewheeling switch transistor on the high-frequency bridge arm to which the inductor is connected is in an on state, and a main switch transistor on the high-frequency bridge arm is in an off state, controlling the freewheeling switch transistor in the on state to maintain in the on state and the main switch transistor in the off state to maintain in the off state if the detected inductor current does not reach a preset positive current, and controlling the freewheeling switch transistor in the on state to be turned off and the main switch transistor in the off state to be turned on if the detected inductor current reaches the preset positive current.

Optionally, before the controlling the freewheeling switch transistor in the on state to maintain in the on state and the main switch transistor in the off state to maintain in the off state, the method may further include:

determining that an instantaneous value of the AC input voltage of the Vienna-like three-level circuit is greater than or equal to a half of a DC output voltage of the Vienna-like three-level circuit.

A device for controlling a Vienna-like three-level circuit is further provided according to the embodiments of the disclosure, where the device includes:

a detection unit configured to detect an inductor current of an inductor connected to each operating high-frequency bridge arm in the Vienna-like three-level circuit during a positive half cycle of an AC input voltage of the Vienna-like three-level circuit; and a control unit configured to, in a case that a freewheeling switch transistor on the high-frequency bridge arm to which the inductor is connected is in an on state, and a main switch transistor on the high-frequency bridge arm is in an off state, control the freewheeling switch transistor in the on state to maintain in the on state and the main switch transistor in the off state to maintain in the off state if the detected inductor current does not reach a preset negative current, and control the freewheeling switch transistor in the on state to be turned off and the main switch transistor in the off state to be turned on if the detected inductor current reaches the preset negative current.

Optionally, the control unit may be further configured to determine that an instantaneous value of the AC input voltage of the Vienna-like three-level circuit is greater than or equal to a half of a DC output voltage of the Vienna-like three-level circuit before controlling the freewheeling switch transistor in the on state to maintain in the on state and the main switch transistor in the off state to maintain in the off state.

A device for controlling a Vienna-like three-level circuit is provided according to the embodiments of the disclosure, where the device includes:

a detection unit configured to detect an inductor current of an inductor connected to each operating high-frequency bridge arm in the Vienna-like three-level circuit during a negative half cycle of an AC input voltage of the Vienna-like three-level circuit; and a control unit configured to, in a case that a freewheeling switch transistor on the high-frequency bridge arm to which the inductor is connected is in an on state, and a main switch transistor on the high-frequency bridge arm is in an off state, control the freewheeling switch transistor in the on state to maintain in the on state and the main switch transistor in the off state to maintain in the off state if the detected inductor current does not reach a preset positive current, and control the freewheeling switch transistor in the on state to be turned off and the main switch transistor in the off state to be turned on if the detected inductor current reaches the preset positive current.

Optionally, the control unit may be further configured to determine that an instantaneous value of the AC input voltage of the Vienna-like three-level circuit is greater than or equal to a half of a DC output voltage of the Vienna-like three-level circuit before controlling the freewheeling switch transistor in the on state to maintain in the on state and the main switch transistor in the off state to maintain in the off state.

In the solution according to the embodiments of the disclosure, in a case that the freewheeling switch transistor on the operating high-frequency bridge arm is in the on state, and the main switch transistor on the operating high-frequency bridge arm is in the off state, the freewheeling switch transistor and the main switch transistor are controlled to maintain in the current states until the current of the inductor connected to the high-frequency bridge arm flows reversely, then the freewheeling switch transistor is controlled to be turned off, and the main switch transistor is controlled to be turned on. Because of the existence of the reverse current, zero-voltage turning on of the main switch transistor and the freewheeling switch transistor can be achieved, i.e., zero-voltage turning on of the high-frequency bridge arm switch transistor is achieved.

BRIEF DESCRIPTION OF THE DRAWINGS

The present disclosure can be further understood in conjunction with the drawings, and the drawings, as a part of the specification, along with the embodiments of the present disclosure are used to explain the present disclosure, and are not intended to limit the present disclosure. In the drawings:

FIG. 2 is a first flow chart of a method for controlling the Vienna-like three-level circuit according to the embodiment of the disclosure;

FIG. 3 is a second flow chart of the method for controlling the Vienna-like three-level circuit according to the embodiment of the disclosure;

FIG. 5($b$) is a second schematic diagram illustrating an operation state of the Vienna-like three-level circuit according to the embodiment of the disclosure;

FIG. 5($c$) is a third schematic diagram illustrating an operation state of the Vienna-like three-level circuit according to the embodiment of the disclosure;

FIG. 5($d$) is a fourth schematic diagram illustrating an operation state of the Vienna-like three-level circuit according to the embodiment of the disclosure;

FIG. 5($e$) is a fifth schematic diagram illustrating an operation state of the Vienna-like three-level circuit according to the embodiment of the disclosure;

FIG. 5($f$) is a sixth schematic diagram illustrating an operation state of the Vienna-like three-level circuit according to the embodiment of the disclosure;

DETAILED DESCRIPTION OF THE EMBODIMENTS

Figure 1:
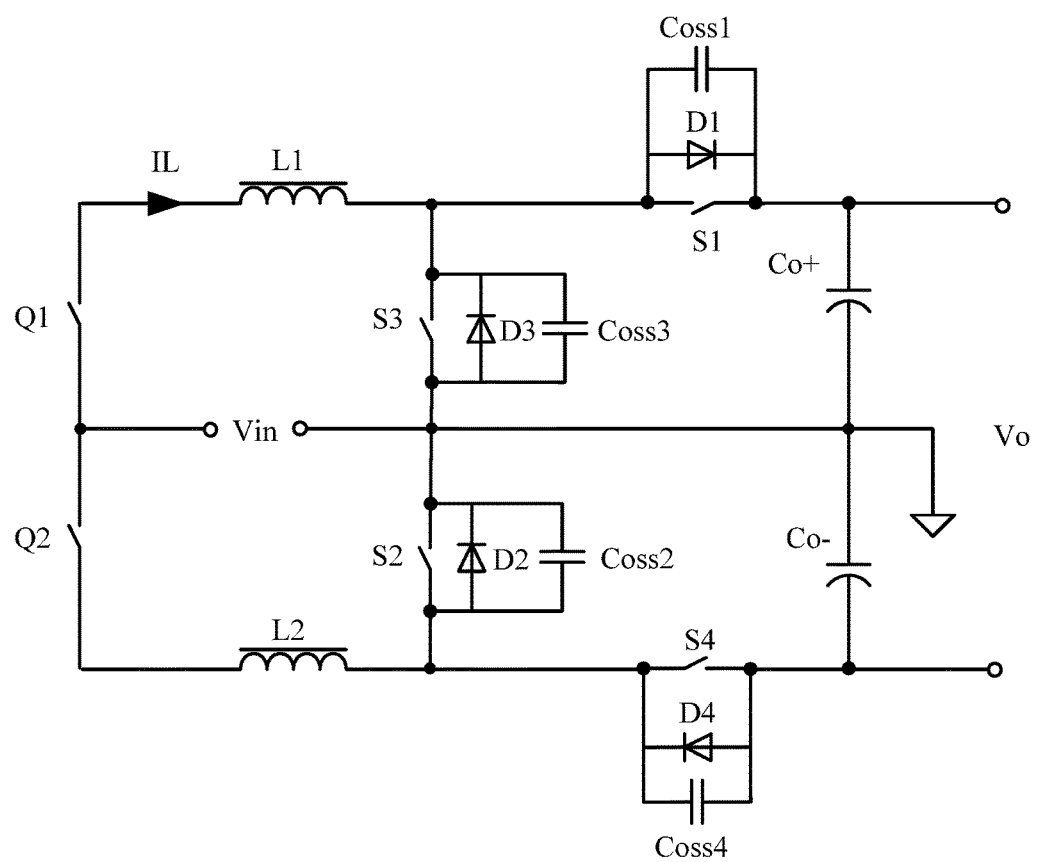
FIG. 1 is a first schematic structural diagram of a Vienna-like three-level circuit.

In order to provide a solution of zero-voltage turning on of the high-frequency bridge arm in the Vienna-like three-level circuit, a method and a device for a controlling Vienna-like three-level circuit are provided according to the embodiments of the disclosure. The preferred embodiments of the disclosure are described in detail hereinafter in conjunction with drawings. It should be understood that the preferred embodiments of the disclosure described herein are intended to illustrate and explain rather than to limit the disclosure. The embodiments of the disclosure and the features according to the embodiments may be combined if they do not conflict.

A method for controlling a Vienna-like three-level circuit is provided according to the embodiments of the disclosure. As shown in FIG. 2, the method includes the following steps 201 and 202.

In step 201, an inductor current of an inductor connected to each operating high-frequency bridge arm in the Vienna-like three-level circuit is detected during a positive half cycle of an AC input voltage of the Vienna-like three-level circuit.

In step 202, in a case that a freewheeling switch transistor on the high-frequency bridge arm to which the inductor is connected is in an on state, and a main switch transistor on the high-frequency bridge arm is in an off state, the freewheeling switch transistor in the on state is controlled to maintain in the on state and the main switch transistor in the off state is controlled to maintain in the off state if the detected inductor current does not reach a preset negative current, and the freewheeling switch transistor in the on state is controlled to be turned off and the main switch transistor in the off state is controlled to be turned on if the detected inductor current reaches the preset negative current.

Since in the conventional technology, according to the commonly used inductor current continuous conduction mode control method such as the CRM (Critical Conduction Mode) control method for the Vienna-like three-level circuit, the zero-voltage turning on of the high-frequency bridge arm switch transistor can be achieved when the instantaneous value of the AC input voltage of the Vienna-like three-level circuit is smaller than a half of the DC output voltage of the Vienna-like three-level circuit, but cannot be achieved when the instantaneous value of the AC input voltage of the Vienna-like three-level circuit is greater than or equal to a half of the DC output voltage of the Vienna-like three-level circuit.

Therefore, the control method according to the embodiments of the disclosure can be used when the instantaneous value of the AC input voltage of the Vienna-like three-level circuit is greater than or equal to a half of the DC output voltage of the Vienna-like three-level circuit, and the control method in the conventional technology can be still used when the instantaneous value of the AC input voltage of the Vienna-like three-level circuit is smaller than a half of the DC output voltage of the Vienna-like three-level circuit.

That is, in step 202, before the controlling the freewheeling switch transistor in the on state to maintain in the on state and the main switch transistor in the off state to maintain in the off state, the method further includes: determining that an instantaneous value of the AC input voltage of the Vienna-like three-level circuit is greater than or equal to a half of a DC output voltage of the Vienna-like three-level circuit.

Correspondingly, a method for controlling a Vienna-like three-level circuit is further provided according to the embodiments of the disclosure. As shown in FIG. 3, the method may include the following steps 301 and 302.

In step 301, an inductor current of an inductor connected to each operating high-frequency bridge arm in the Vienna-like three-level circuit is detected during a negative half cycle of an AC input voltage of the Vienna-like three-level circuit.

In step 302, in a case that a freewheeling switch transistor on the high-frequency bridge arm to which the inductor is connected is in an on state, and a main switch transistor on the high-frequency bridge arm is in an off state, the freewheeling switch transistor in the on state is controlled to maintain in the on state and the main switch transistor in the off state is controlled to maintain in the off state if the detected inductor current does not reach a preset positive current, and the freewheeling switch transistor in the on state is controlled to be turned off and the main switch transistor in the off state is controlled to be turned on if the detected inductor current reaches the preset positive current.

Optionally, before the controlling the freewheeling switch transistor in the on state to maintain in the on state and the main switch transistor in the off state to maintain in the off state, the method further includes: determining that an instantaneous value of the AC input voltage of the Vienna-like three-level circuit is greater than or equal to a half of a DC output voltage of the Vienna-like three-level circuit.

Of course, the control method according to the embodiments of the disclosure can also be used when the instantaneous value of the AC input voltage of the Vienna-like three-level circuit is smaller than a half of the DC output voltage of the Vienna-like three-level circuit.

In the control method according to the embodiments of the disclosure, the detection of the inductor current in the above steps 201 and 301 may be implemented by directly sampling the inductor current, or by sampling a switch transistor current and calculating the inductor current based on the switch transistor current.

The control method according to the embodiments of the disclosure can be but is not limited to be applied to the Vienna-like three-level circuit shown in FIG. 1. In the following, the Vienna-like three-level circuit shown in FIG. 1 is taken as an example to describe operation states of the Vienna-like three-level circuit to which the control method according to the embodiments of the disclosure is applied.

Figure 4:
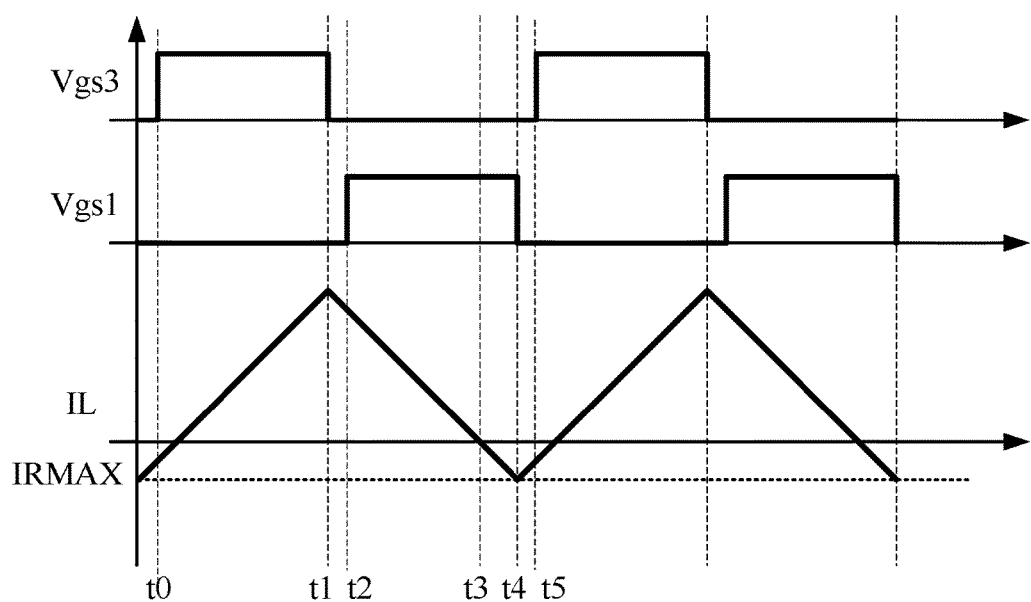
FIG. 4 is a schematic diagram illustrating a drive signal for the high-frequency bridge arm switch transistor in the Vienna-like three-level circuit according to the embodiment of the disclosure.

In the positive half cycle of the AC input voltage Vin of the Vienna-like three-level circuit shown in FIG. 1, the switch transistor Q1 is in the on state, the first high-frequency bridge arm is in the operating state, the switch transistor S3 is the main switch transistor, and the switch transistor S1 is the freewheeling switch transistor. Considering the dead time, a drive signal Vgs3 for the main switch transistor S3 and a drive signal Vgs1 for the freewheeling switch transistor S1 are shown in FIG. 4, where IL is a current of the inductor L1 connected to the first high-frequency bridge arm, IRMAX is a preset negative current, and the period t0 to t5 is one switching cycle.

Figure 5:
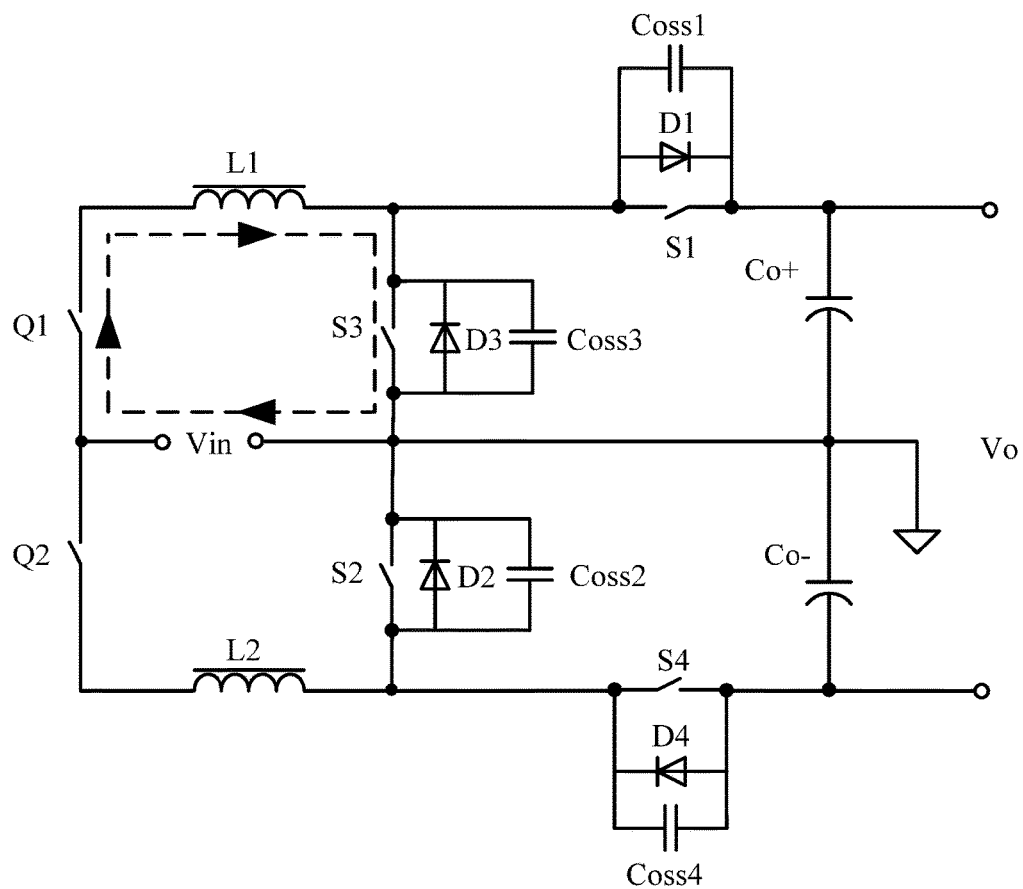
FIG. 5($a$) is a first schematic diagram illustrating an operation state of the Vienna-like three-level circuit according to the embodiment of the disclosure.
Figure 5:
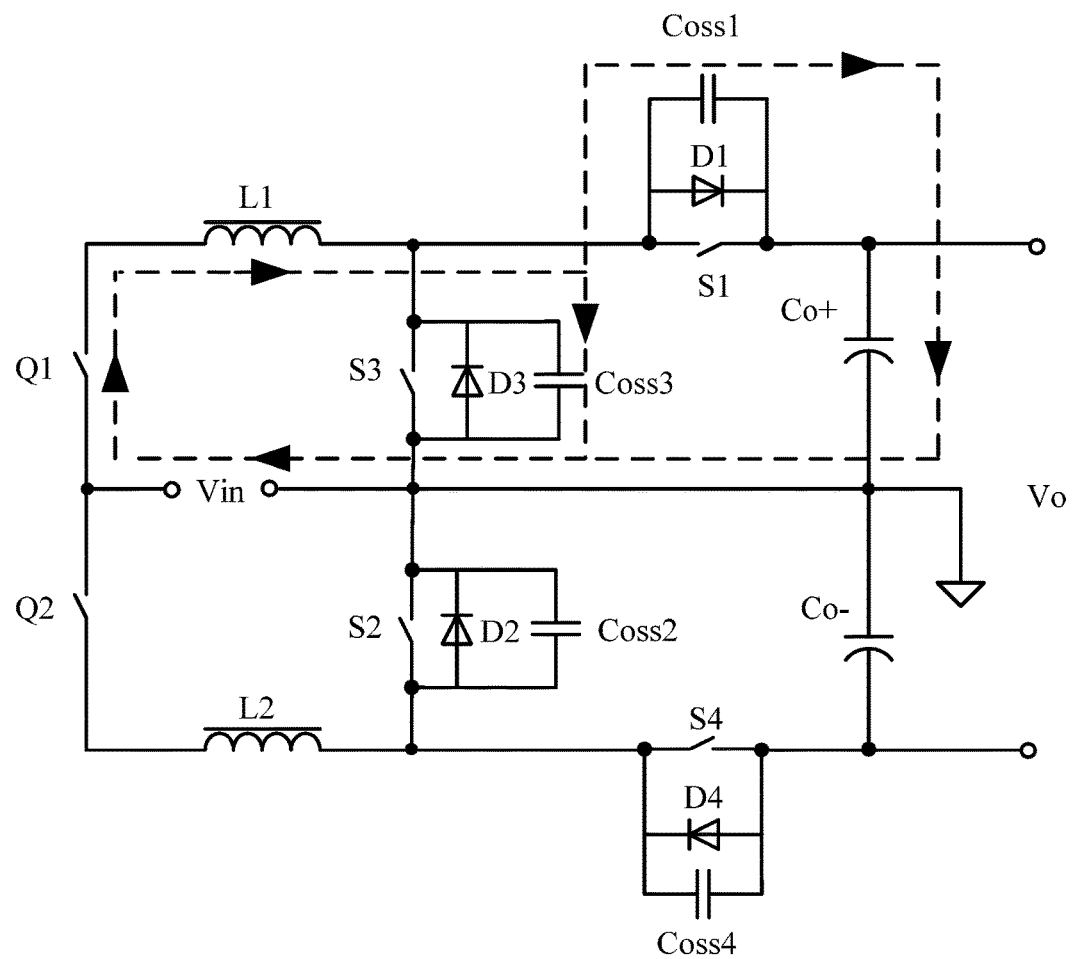
Figure 5:
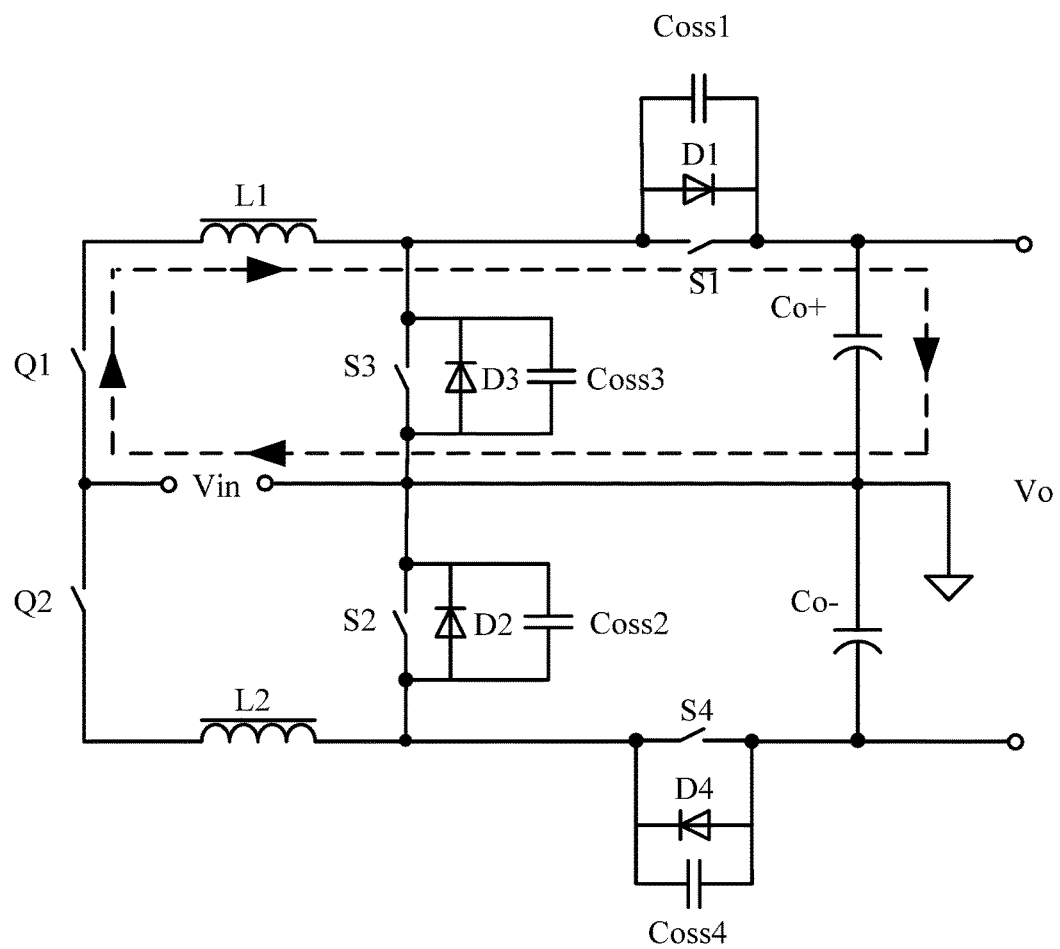
Figure 5:
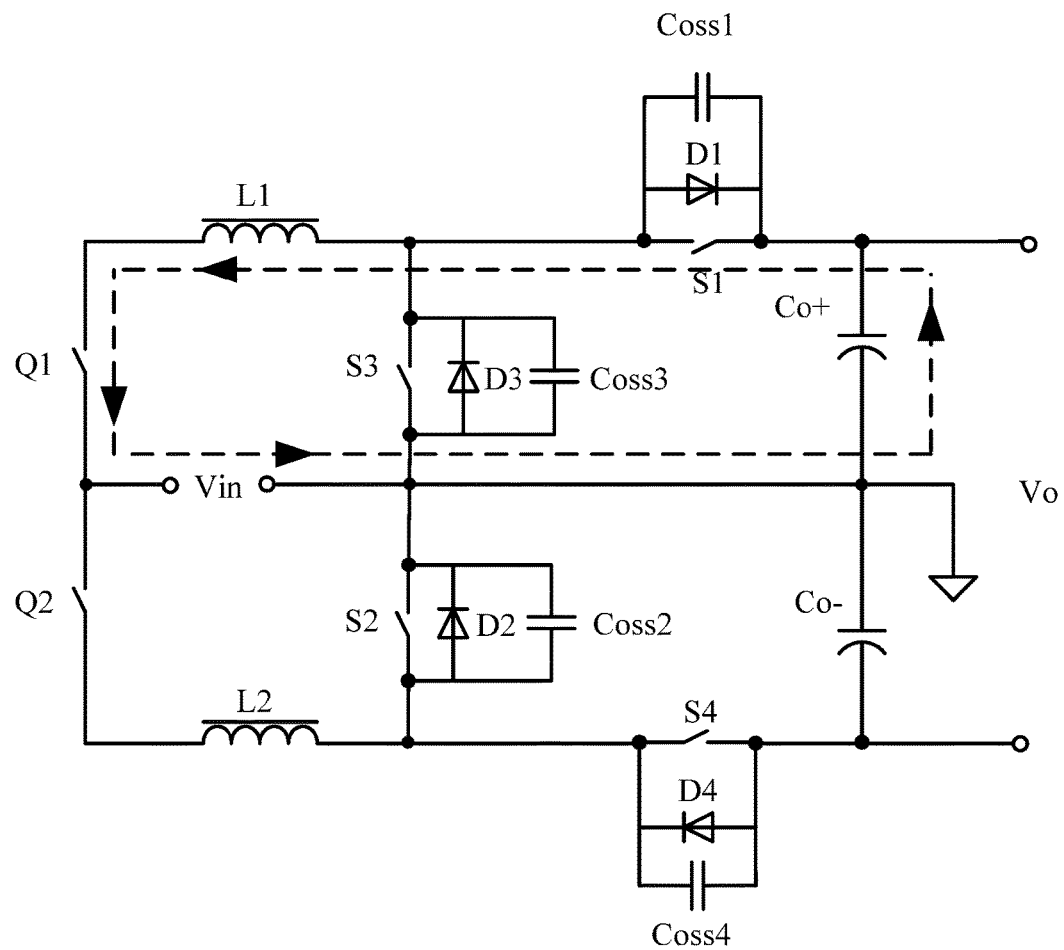
Figure 5:
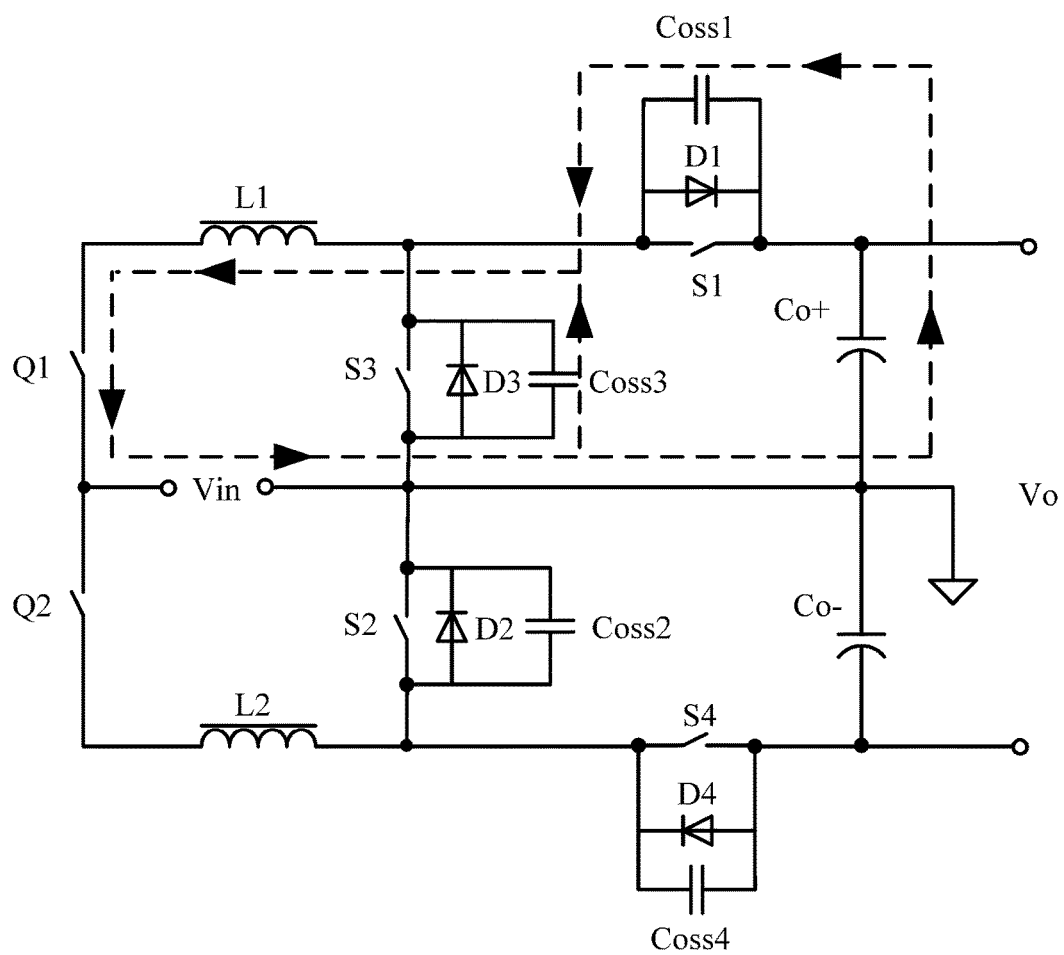
Figure 5:
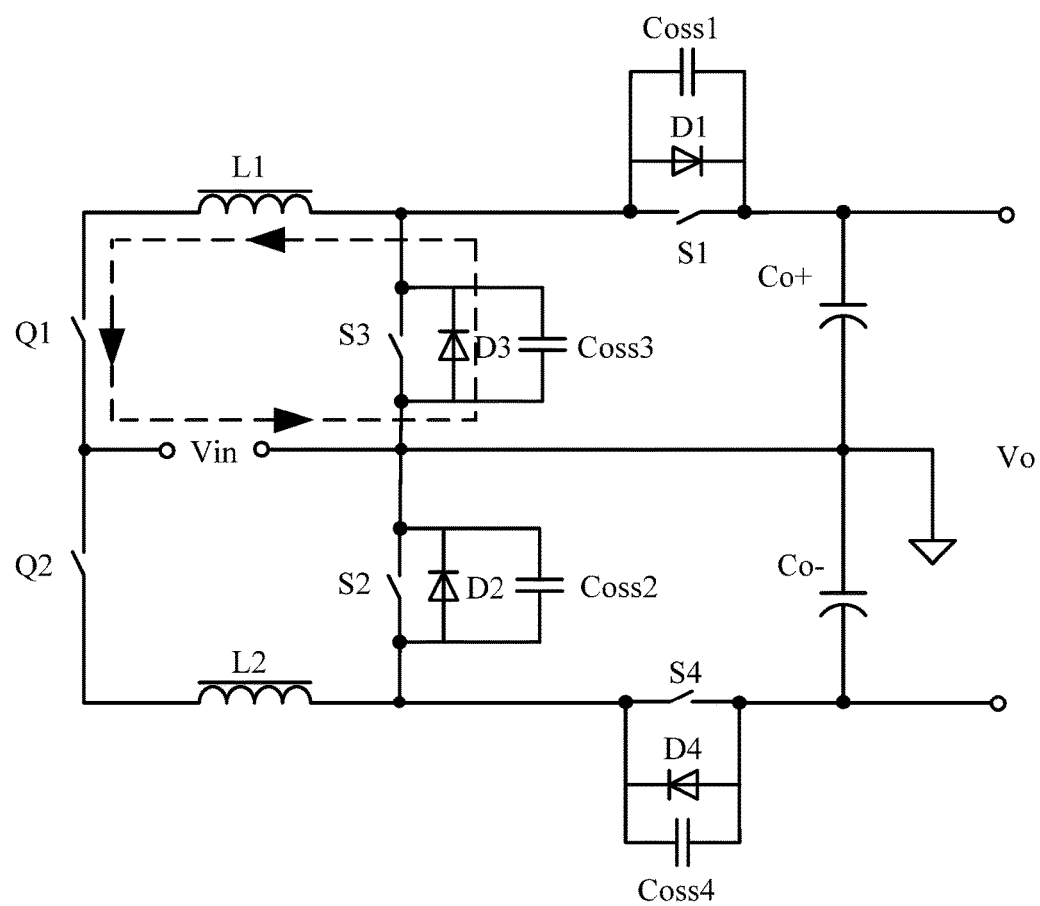

During the period t0 to t1, the main switch transistor S3 is in the on state, the freewheeling switch transistor S1 is in the off state. The operation state of the Vienna-like three-level circuit shown in FIG. 1 is as shown in FIG. 5(a), where the main switch transistor S3, the switch transistor Q1 and the inductor L1 constitute a current loop. The negative inductor current gradually decreases to 0, the direction of the inductor current is changed from negative to positive, and the positive inductor current increases gradually.

During the period t1 to t2, both the main switch transistor S3 and the freewheeling switch transistor S1 are in the off state. This period is a dead time $T_{XZ1}$ during which the main switch transistor S3 and the freewheeling switch transistor S1 are complementarily turned on. The operation state of the Vienna-like three-level circuit shown in FIG. 1 is as shown in FIG. 5(b), where the equivalent junction capacitor Coss1 of the freewheeling switch transistor S1 discharges, the equivalent junction capacitor Coss3 of the main switch transistor S3 charges, and the positive inductor current decreases gradually.

During the period t2 to t3, the main switch transistor S3 is in the off state, the freewheeling switch transistor S1 is in the on state. The operation state of the Vienna-like three-level circuit shown in FIG. 1 is as shown in FIG. 5(c), where the freewheeling switch transistor S1, the bus capacitor Co+, the switch transistor Q1 and the inductor L1 constitute a current loop, and the positive inductor current gradually decreases to 0.

It is obvious that the turning on of the freewheeling switch transistor S1 at the time instant t2 is zero-voltage turning on.

During the period t3 to t4, the main switch transistor S3 is maintained in the off state, the freewheeling switch transistor S1 is maintained in the on state. The operation state of the Vienna-like three-level circuit shown in FIG. 1 is as shown in FIG. 5(d), where the direction of the inductor current is changed from positive to negative, and the negative inductor current gradually increases to the preset negative current IRMAX.

During the period t4 to t5, both the main switch transistor S3 and the freewheeling switch transistor S1 are in the off state. This period includes two sub-periods.

A first sub-period is a dead time $T_{XZ2}$ during which the main switch transistor S3 and the freewheeling switch transistor S1 are complementarily turned on. During this period, the operation state of the Vienna-like three-level circuit shown in FIG. 1 is as shown in FIG. 5(e), where the equivalent junction capacitor Coss1 of the freewheeling switch transistor S1 charges, and the equivalent junction capacitor Coss3 of the main switch transistor S3 discharges.

A second sub-period is a reversing time $T_F$. During this period, the operation state of the Vienna-like three-level circuit shown in FIG. 1 is as shown in FIG. 5(f), where the diode D3, the inductor L1 and the switch transistor Q1 constitute a current loop, and the negative inductor current decreases gradually.

It is obvious that the turning on of the main switch transistor S3 at the time instant t0 is zero-voltage turning on.

Specifically, the reversing time $T_F$ in the period t4 to t5 can be determined based on the following equation:

$$T_F = \frac{L1 \times IRMAX}{Vin}.$$

That is, a length of the period t4 to t5 can be determined. During each period, lengths of the period t0 to t1, the period t2 to t3, and the period t3 to t4 need to be determined. In a case that the switching cycle is known, the length of the period t2 to t3 can be determined if lengths of the period t0 to t1 and the period t3 to t4 are determined.

There are countless combinations for the lengths of the period t0 to t1 and the length of the period t3 to t4. A shorter length of the period t0 to t1 indicates a longer length of the period t3 to t4 and a smaller inductor current, thereby resulting in small inductor loss; a longer length of the period t0 to t1 indicates a shorter length of the period t3 to t4 and a smaller turn-off current of the main switch transistor S3, thereby resulting in a small turn-off loss of the main switch transistor S3. Therefore, in an actual application, the lengths of the period t0 to t1 and the period t3 to t4 may be determined according to the requirement of the specific application scenario.

As can be seen from the above description on the operation states of the Vienna-like three-level circuit, in the positive half cycle of the AC input voltage Vin of the Vienna-like three-level circuit shown in FIG. 1, the zero-voltage turning on of the main switch transistor S3 can be achieved, the reverse recovery loss of the diode D1 corresponding to the freewheeling switch transistor S1 can be eliminated, and the zero-voltage turning on and approximately zero-current turning-off of the freewheeling switch transistor S1 can be achieved by means of the control method according to the embodiments of the disclosure.

In the negative half cycle of the AC input voltage Vin of the Vienna-like three-level circuit shown in FIG. 1, the switch transistor Q2 is in the on state, the second high-frequency bridge arm is in the operation state, the switch transistor S2 is the main switch transistor, the switch transistor S4 is the freewheeling switch transistor. The operation states of the Vienna-like three-level circuit are the same as the operation states of the Vienna-like three-level circuit during the positive half cycle of the AC input voltage Vin of the Vienna-like three-level circuit, and are not described in detail herein.

In the negative half cycle of the AC input voltage Vin of the Vienna-like three-level circuit shown in FIG. 1, the zero-voltage turning on of the main switch transistor S2 can be achieved, the reverse recovery loss of the diode D4 corresponding to the freewheeling switch transistor S4 can be eliminated, and the zero-voltage turning on and approximately zero-current turning-off of the freewheeling switch transistor S4 can be achieved by means of the control method according to the embodiments of the disclosure.

As can be seen, by using the method for controlling the Vienna-like three-level circuit according to the embodiments of the disclosure, in a case that the freewheeling switch transistor on the operating high-frequency bridge arm is in the on state, and the main switch transistor on the operating high-frequency bridge arm is in the off state, the freewheeling switch transistor and the main switch transistor are controlled to maintain in the current states until the current of the inductor connected to the high-frequency bridge arm flows reversely, then the freewheeling switch transistor is controlled to be turned off, and the main switch transistor is controlled to be turned on. Because of the existence of the reverse current, zero-voltage turning on of the high-frequency bridge arm switch transistor is achieved, the circuit loss is reduced, and the circuit efficiency is improved.

Figure 6:
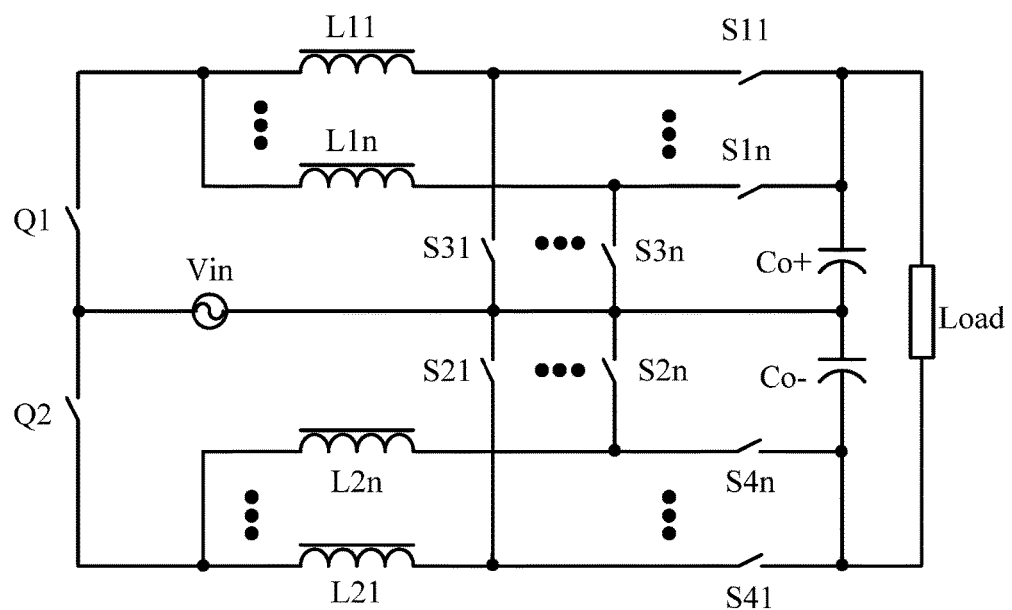
FIG. 6 is a second schematic structural diagram of a Vienna-like three-level circuit.
Figure 7:
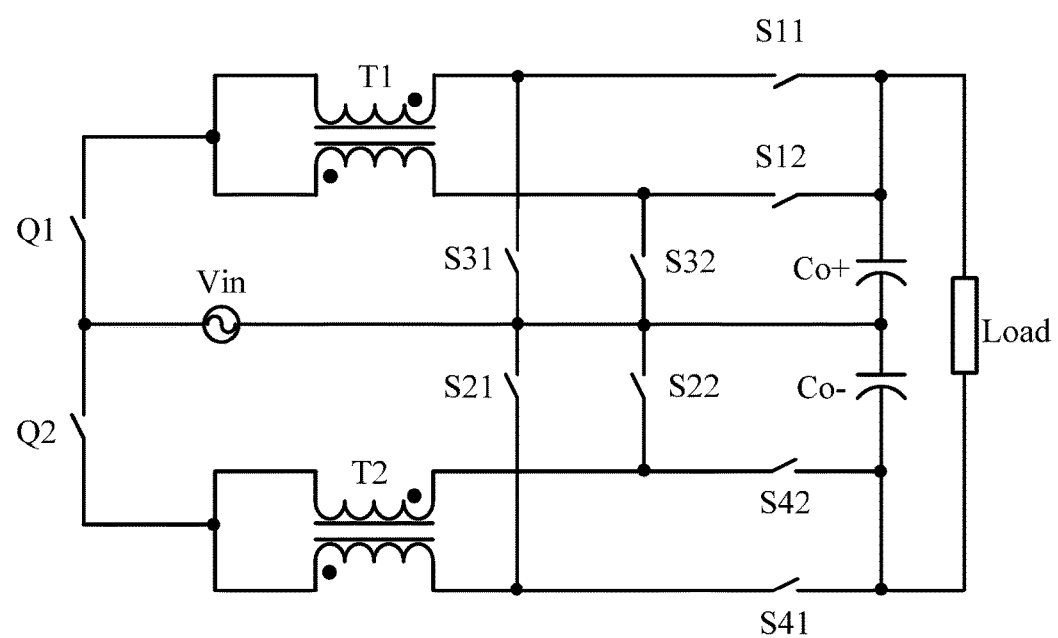
FIG. 7 is a third schematic structural diagram of a Vienna-like three-level circuit.
Figure 8:
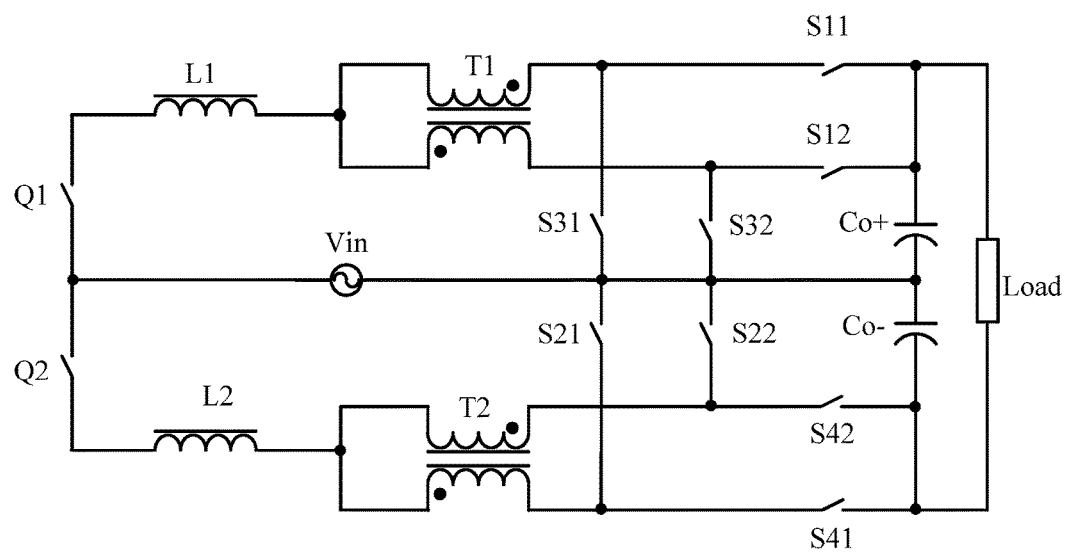
FIG. 8 is a fourth schematic structural diagram of a Vienna-like three-level circuit.
Figure 9:
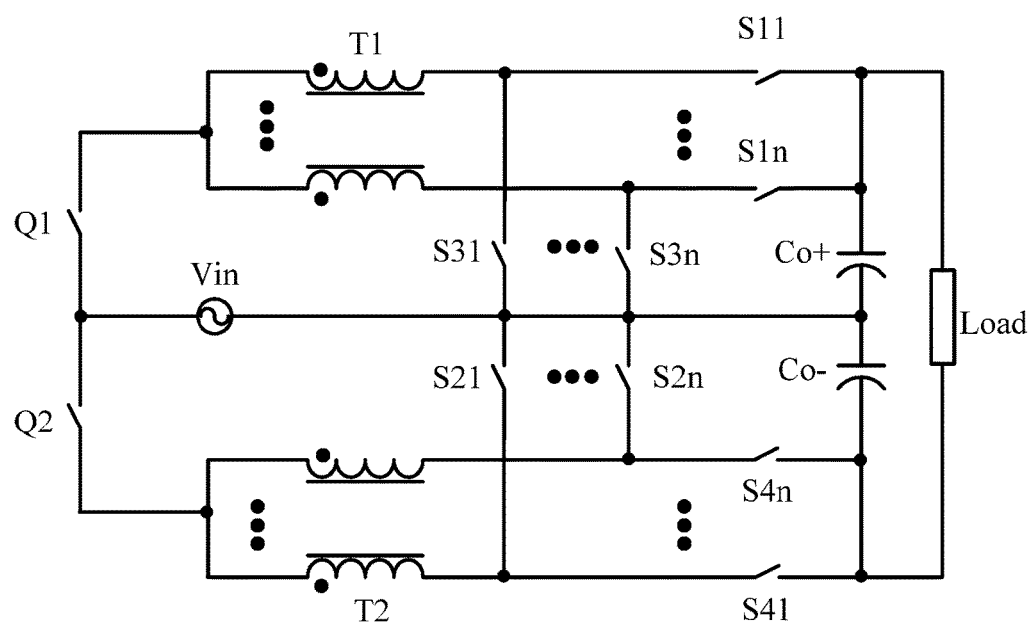
FIG. 9 is a fifth schematic structural diagram of a Vienna-like three-level circuit.
Figure 10:
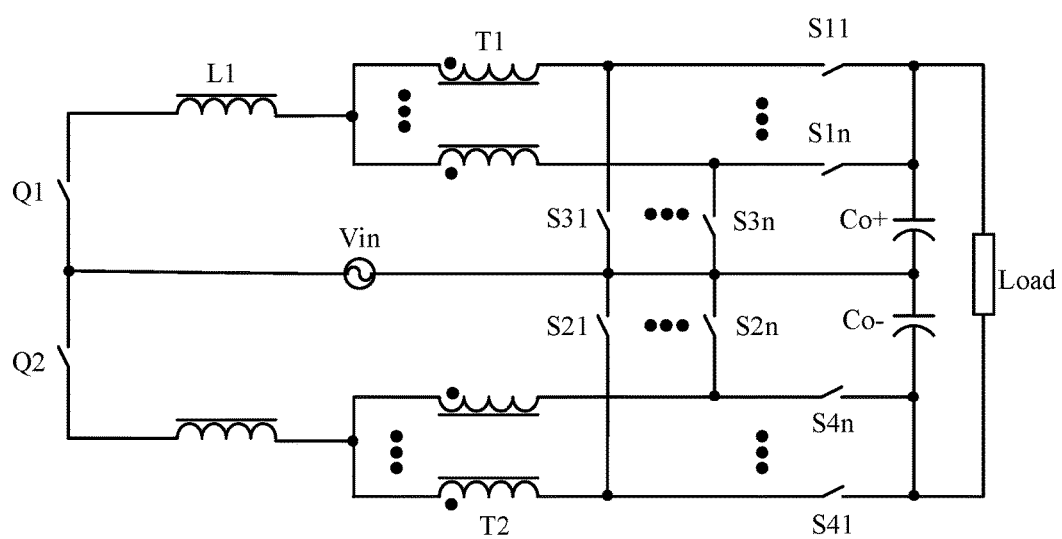
FIG. 10 is a sixth schematic structural diagram of a Vienna-like three-level circuit.
Figure 11:
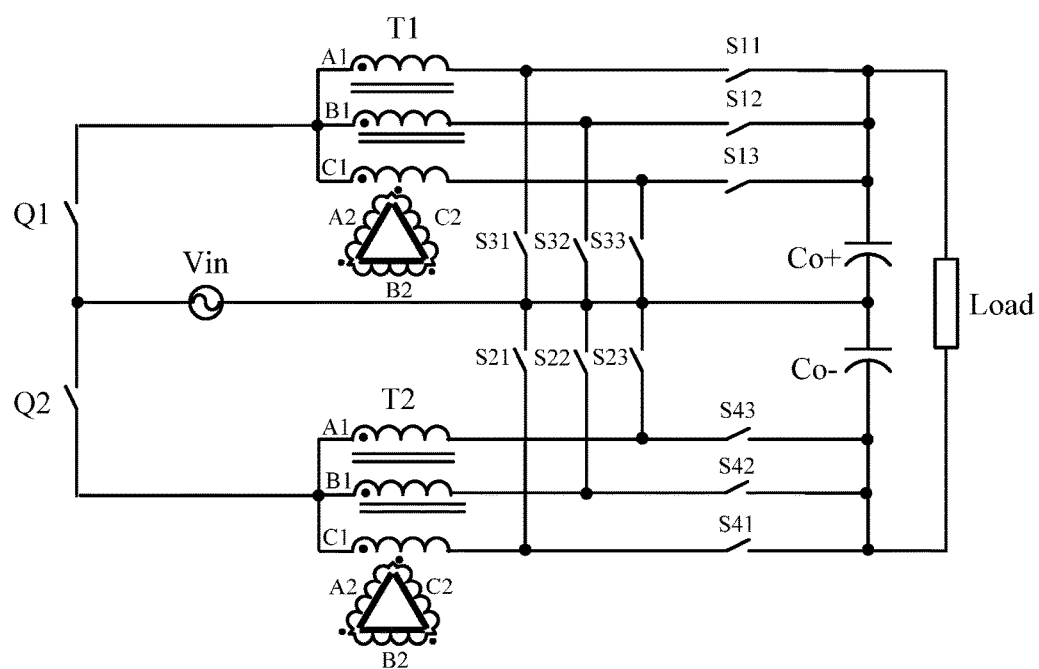
FIG. 11 is a seventh schematic structural diagram of a Vienna-like three-level circuit.
Figure 12:
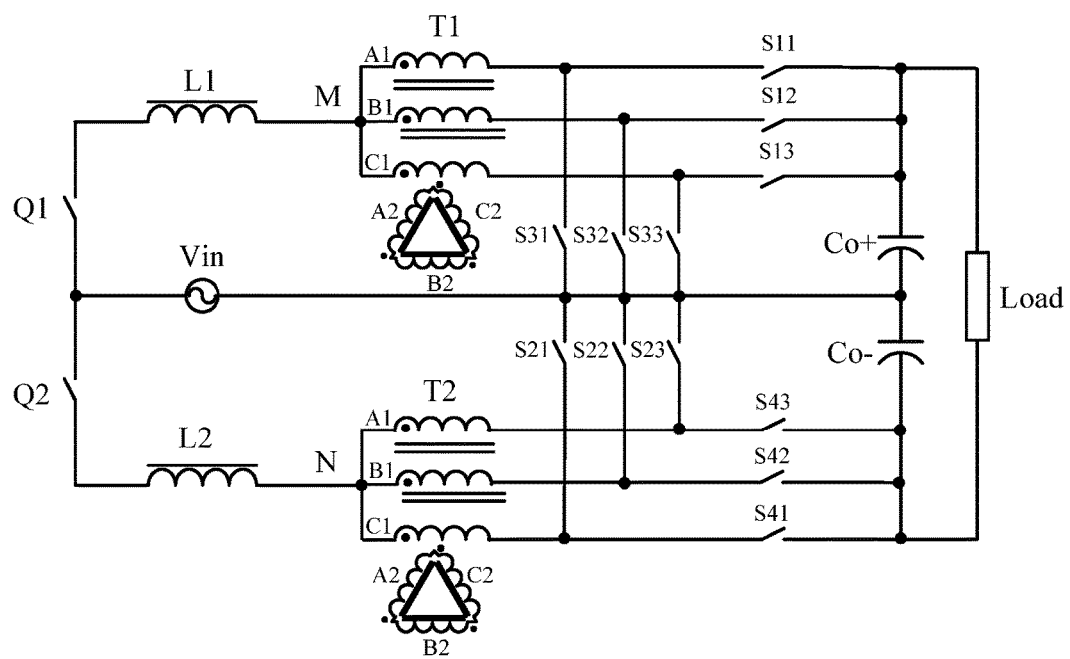
FIG. 12 is an eighth schematic structural diagram of a Vienna-like three-level circuit.

The control method according to the embodiments of the disclosure can also be applied to the interleaved parallel-connected Vienna-like three-level circuit shown in FIG. 6.

As compared with the Vienna-like three-level circuit shown in FIG. 1, the interleaved parallel-connected Vienna-like three-level circuit shown in FIG. 6 can reduce input current ripple of the circuit, and improve the THDi (Total Harmonic Distribution) and PF (Power Factor) of the circuit. In order to ensure the equal distribution of inductor currents, a current equalization control ring can be additionally provided in the control method.

The control method according to the embodiments of the disclosure can also be applied to multi-state switch Vienna-like three-level circuits shown in FIGS. 7 to 12.

In the multi-state switch Vienna-like three-level circuit shown in FIGS. 7 to 12, automatic current equalization is performed by means of a coupling inductor or a voltage element. As compared with the interleaved parallel-connected Vienna-like three-level circuit shown in FIG. 6, the multi-state switch Vienna-like three-level circuit has the advantage of the interleaved parallel-connected Vienna-like three-level circuit without the problem of non-equalized current of the interleaved parallel-connected Vienna-like three-level circuit.

Figure 13:
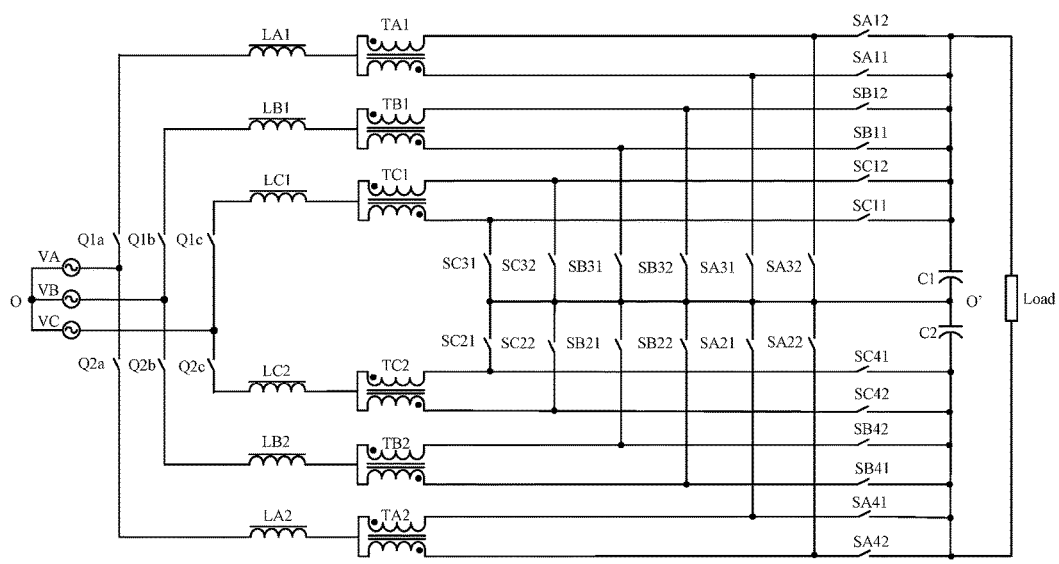
FIG. 13 is a ninth schematic structural diagram of a Vienna-like three-level circuit.

The Vienna-like three-level circuits in the above FIGS. 1 and 6 to 12 are all single-phase Vienna-like three-level circuits. The control method according to the embodiments of the disclosure can also be applied to various three-phase Vienna-like three-level circuits, such as the three-phase Vienna-like three-level circuit shown in FIG. 13.

Of course, the control method according to the embodiments of the disclosure can also be applied to other Vienna-like three-level circuits, which will not be exemplified herein.

Figure 14:
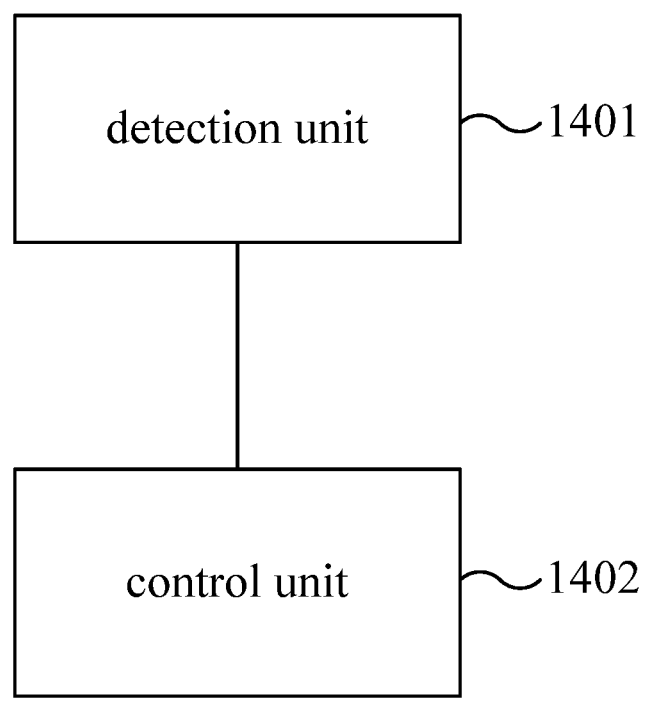
FIG. 14 is a first schematic structural diagram of a device for controlling the Vienna-like three-level circuit according to the embodiment of the disclosure.

Based on a same inventive concept, and according to the method for controlling the Vienna-like three-level circuit according to the above embodiments of the disclosure, correspondingly, a device for controlling the Vienna-like three-level circuit is further provided according to the embodiments of the disclosure. As shown in FIG. 14, the device includes a detection unit 1401 and a control unit 1402.

The detection unit 1401 is configured to detect an inductor current of an inductor connected to each operating high-frequency bridge arm in the Vienna-like three-level circuit during a positive half cycle of an AC input voltage of the Vienna-like three-level circuit.

The control unit 1402 is configured to, in a case that a freewheeling switch transistor on the high-frequency bridge arm to which the inductor is connected is in an on state, and a main switch transistor on the high-frequency bridge arm is in an off state, control the freewheeling switch transistor in the on state to maintain in the on state and the main switch transistor in the off state to maintain in the off state if the detected inductor current does not reach a preset negative current, and control the freewheeling switch transistor in the on state to be turned off and the main switch transistor in the off state to be turned on if the detected inductor current reaches the preset negative current.

Optionally, the control unit 1402 is further configured to determine that an instantaneous value of the AC input voltage of the Vienna-like three-level circuit is greater than or equal to a half of a DC output voltage of the Vienna-like three-level circuit before controlling the freewheeling switch transistor in the on state to maintain in the on state and the main switch transistor in the off state to maintain in the off state.

Figure 15:
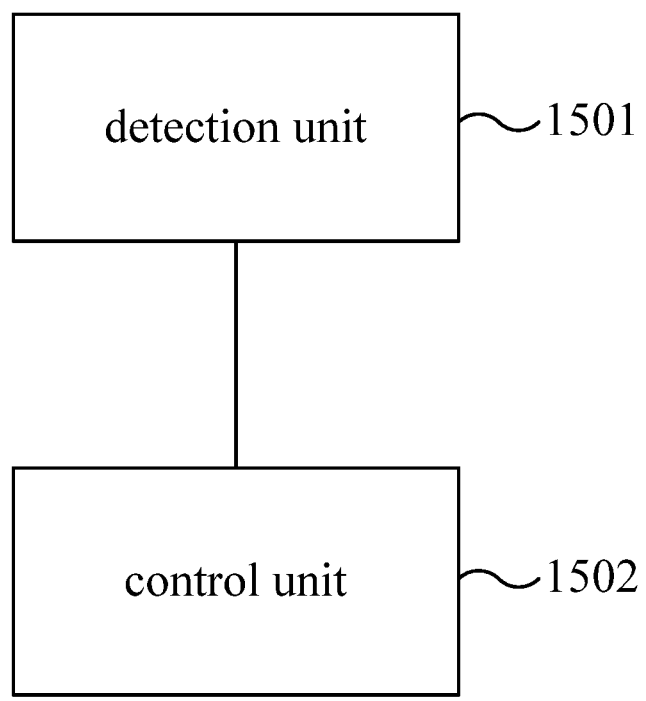
FIG. 15 is a second schematic structural diagram of the device for controlling the Vienna-like three-level circuit according to the embodiment of the disclosure.

Based on a same inventive concept, and according to the method for controlling the Vienna-like three-level circuit according to the above embodiments of the disclosure, correspondingly, a device for controlling the Vienna-like three-level circuit is further provided according to the embodiments of the disclosure. As shown in FIG. 15, the control device includes a detection unit 1501 and a control unit 1502.

The detection unit 1501 is configured to detect an inductor current of an inductor connected to each operating high-frequency bridge arm in the Vienna-like three-level circuit during a negative half cycle of an AC input voltage of the Vienna-like three-level circuit.

The control unit 1502 is configured to, in a case that a freewheeling switch transistor on the high-frequency bridge arm to which the inductor is connected is in an on state, and a main switch transistor on the high-frequency bridge arm is in an off state, control the freewheeling switch transistor in the on state to maintain in the on state and the main switch transistor in the off state to maintain in the off state if the detected inductor current does not reach a preset positive current, and control the freewheeling switch transistor in the on state to be turned off and the main switch transistor in the off state to be turned on if the detected inductor current reaches the preset positive current.

Optionally, the control unit 1502 is further configured to determine that an instantaneous value of the AC input voltage of the Vienna-like three-level circuit is greater than or equal to a half of a DC output voltage of the Vienna-like three-level circuit before controlling the freewheeling switch transistor in the on state to maintain in the on state and the main switch transistor in the off state to maintain in the off state.

Please refer to the above embodiments of the method for controlling the Vienna-like three-level circuit for the specific function of each unit, which is not described in detail herein.

Further, the function of the control device shown in FIG. 14 and the function of the control device shown in FIG. 15 can be implemented with a same control device.

In this case, the function of the detection unit 1401 in FIG. 14 and the function of the detection unit 1501 in FIG. 15 are implemented with a same detection unit, and the function of the control unit 1402 in FIG. 14 and the function of the control unit 1502 in FIG. 15 are implemented with a same control unit.

Figure 16:
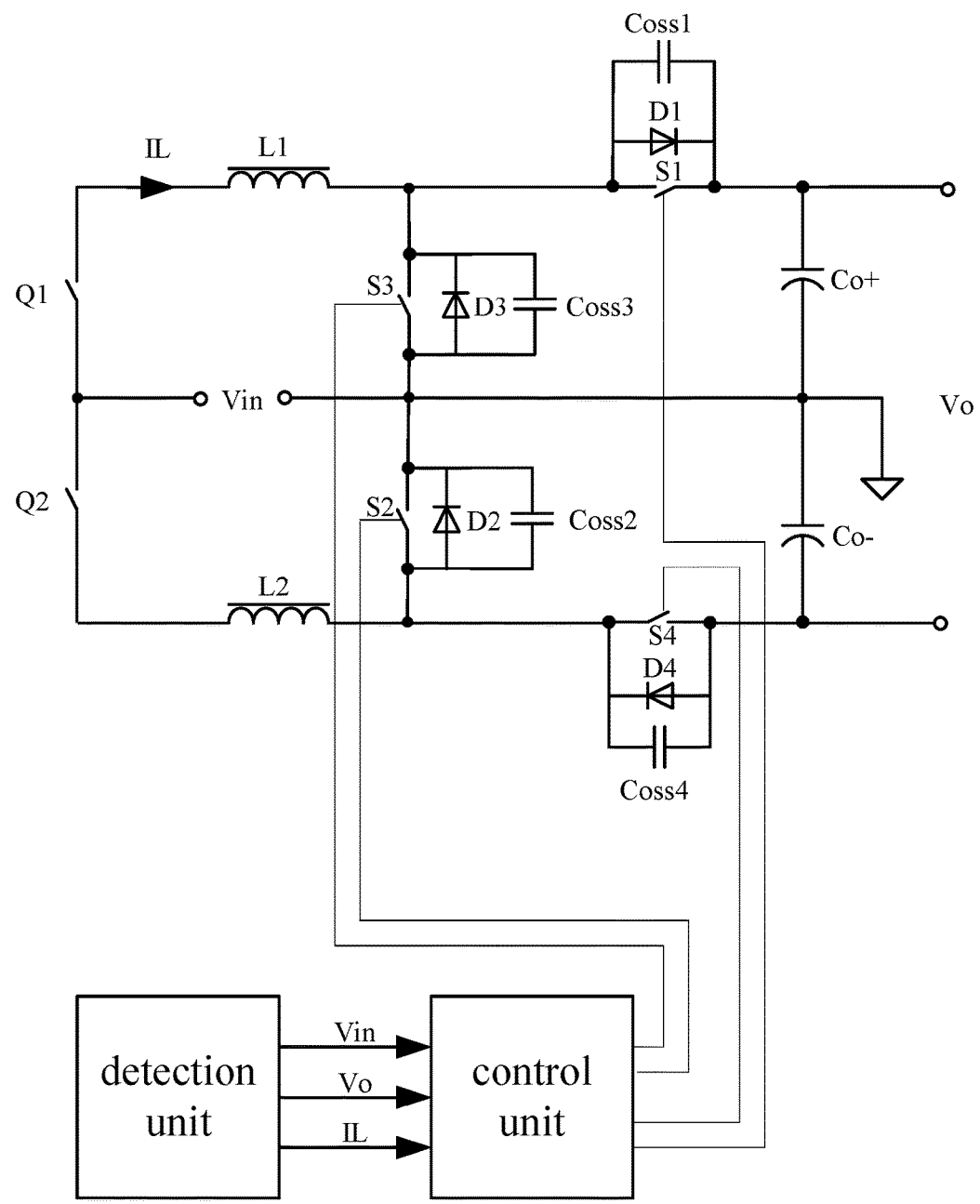
FIG. 16 is a schematic diagram illustrating the application of the device for controlling the Vienna-like three-level circuit according to the embodiment of the disclosure.

The control device according to the embodiments of the disclosure can be applied to the Vienna-like three-level circuit shown in FIG. 1, as shown in FIG. 16, and also can be applied to the Vienna-like three-level circuits shown in FIGS. 6 to 13, which will not be illustrated in drawings.

In actual implementation, the control units in FIGS. 14 to 16 can be implemented by means of combination operation of a DSP (Digital Signal Processing), a CPLD (Complex Programmable Logic Device)/FPGA (Field-programmable Gate Array) and a switch transistor drive circuit. When the control algorithm is simple, CPLD/FPGA can be omitted.

That is, the specific implementation of the control unit can be determined according to the actual application scenario, and is not limited in this disclosure.

In summary, by using the control scheme for the Vienna-like three-level circuit according to the embodiments of the disclosure, during the positive half cycle of the AC input voltage of the Vienna-like three-level circuit, in a case that the freewheeling switch transistor on the operating high-frequency bridge arm is in the on state, and the main switch transistor on the operating high-frequency bridge arm is in the off state, the freewheeling switch transistor and the main switch transistor are controlled to maintain in the current states until the current of the inductor connected to the high-frequency bridge arm flows reversely, and the inductor current reaches the preset negative current, then the freewheeling switch transistor is controlled to be turned off, and the main switch transistor is controlled to be turned on; during the negative half cycle of the AC input voltage of the Vienna-like three-level circuit, in a case that the freewheeling switch transistor on the operating high-frequency bridge arm is in the on state, and the main switch transistor on the operating high-frequency bridge arm is in the off state, the freewheeling switch transistor and the main switch transistor are controlled to maintain in the current states until the current of the inductor connected to the high-frequency bridge arm flows reversely, and the inductor current reaches the preset positive current, then the freewheeling switch transistor is controlled to be turned off, and the main switch transistor is controlled to be turned on. Because of the existence of the reverse current, the zero-voltage turning on of the high-frequency bridge arm switch transistor is achieved, the circuit loss is reduced, and the circuit efficiency is improved.

It is to be understood by those skilled in the art that the embodiments of the present disclosure may be implemented as a method, a system or a computer program product. Hence, the present disclosure may be embodied as only hardware embodiments, only software embodiments or embodiments of a combination of software and hardware. In addition, the present disclosure may be embodied as a computer program product implemented on a computer available storage medium (including but not limited to a magnetic disk memory, CD-ROM, and an optical memory) containing computer available program codes.

The present disclosure is described by referring to flowcharts and/or block diagrams of methods, devices (systems) and computer program products according to the embodiments of the present disclosure. It should be understood that each flow and/or block in the flowcharts and/or block diagrams and a combination of flows and/or blocks in the flowcharts and/or block diagrams may be implemented by computer program instructions. Theses computer program instructions may be provided to a general-purpose computer, a dedicated computer, an embedded processor or processors of other programmable data processing devices to generate a machine language, such that the instructions executed by the computer or the processors of other programmable data processing devices generate a device for achieving functions specified in one or more flow in the flowcharts and/or one or more block in the block diagrams.

These computer program instructions may be stored in a computer readable memory which can guide the computer or other programmable data processing devices to work in a specified mode, such that the instructions stored in the computer readable memory generate a product including an instruction device, which achieves functions specified in one or more flow in the flowcharts and/or one or more blocks in the block diagrams.

These computer program instructions may be loaded to the computer or other programmable data processing devices, such that a series of operation steps are performed on the computer or other programmable devices to generate processing implemented by the computer, and hence the instructions executed on the computer or other programmable devices perform steps for achieving functions specified in one or more flow in the flowcharts and/or one or more block in the block diagrams.

Although preferred embodiments of the present disclosure have been described, those skilled in the art can make additional alternations and changes to these embodiments once they know the basic inventive concepts. Hence, the appended claims are intended to include the preferred embodiments and all the alterations and changes falling within the scope of the present disclosure.

Apparently, those skilled in the art can make various changes and variations of the disclosure without departing from the spirit and scope of the present disclosure. In this way, the present disclosure is intended to include the changes and variations which fall within the scope of claims of the present disclosure and the equivalents thereof.

The invention claimed is:

1. A method for controlling a Vienna-like three-level circuit, comprising:
   detecting an inductor current of an inductor connected to each operating high-frequency bridge arm in the Vienna-like three-level circuit during a positive half cycle of an AC input voltage of the Vienna-like three-level circuit; and
   when an instantaneous value of the AC input voltage of the Vienna-like three-level circuit is greater than or equal to half of a DC output voltage of the Vienna-like three-level circuit, and when a freewheeling switch transistor on the high-frequency bridge arm to which the inductor is connected is in an on state, and when a main switch transistor on the high-frequency bridge arm is in an off state, controlling the freewheeling switch transistor in the on state to maintain in the on state and the main switch transistor in the off state to maintain in the off state if the detected inductor current does not reach a preset negative current, and controlling the freewheeling switch transistor in the on state to be turned off and the main switch transistor in the off state to be turned on if the detected inductor current reaches the preset negative current.

2. The method according to claim 1, wherein before the controlling the freewheeling switch transistor in the on state to maintain in the on state and the main switch transistor in the off state to maintain in the off state, the method further comprises:
   determining that the instantaneous value of the AC input voltage of the Vienna-like three-level circuit is greater than or equal to half of the DC output voltage of the Vienna-like three-level circuit.

3. A method for controlling a Vienna-like three-level circuit, comprising:
   detecting an inductor current of an inductor connected to each operating high-frequency bridge arm in the Vienna-like three-level circuit during a negative half cycle of an AC input voltage of the Vienna-like three-level circuit; and
   when an instantaneous value of the AC input voltage of the Vienna-like three-level circuit is greater than or equal to half of a DC output voltage of the Vienna-like three-level circuit, and when a freewheeling switch transistor on the high-frequency bridge arm to which the inductor is connected is in an on state, and when a main switch transistor on the high-frequency bridge arm is in an off state, controlling the freewheeling switch transistor in the on state to maintain in the on state and the main switch transistor in the off state to maintain in the off state if the detected inductor current does not reach a preset positive current, and controlling the freewheeling switch transistor in the on state to be turned off and the main switch transistor in the off state to be turned on if the detected inductor current reaches the preset positive current.

4. The method according to claim 3, wherein before the controlling the freewheeling switch transistor in the on state to maintain in the on state and the main switch transistor in the off state to maintain in the off state, the method further comprises:

determining that the instantaneous value of the AC input voltage of the Vienna-like three-level circuit is greater than or equal to half of the DC output voltage of the Vienna-like three-level circuit.

5. A device for controlling a Vienna-like three-level circuit, comprising:

a detection unit configured to detect an inductor current of an inductor connected to each operating high-frequency bridge arm in the Vienna-like three-level circuit during a positive half cycle of an AC input voltage of the Vienna-like three-level circuit; and a control unit configured to, when an instantaneous value of the AC input voltage of the Vienna-like three-level circuit is greater than or equal to half of a DC output voltage of the Vienna-like three-level circuit, and when a freewheeling switch transistor on the high-frequency bridge arm to which the inductor is connected is in an on state, and when a main switch transistor on the high-frequency bridge arm is in an off state, control the freewheeling switch transistor in the on state to maintain in the on state and the main switch transistor in the off state to maintain in the off state if the detected inductor current does not reach a preset negative current, and control the freewheeling switch transistor in the on state to be turned off and the main switch transistor in the off state to be turned on if the detected inductor current reaches the preset negative current.

6. The device according to claim 5, wherein the control unit is further configured to determine that the instantaneous value of the AC input voltage of the Vienna-like three-level circuit is greater than or equal to half of the DC output voltage of the Vienna-like three-level circuit before controlling the freewheeling switch transistor in the on state to maintain in the on state and the main switch transistor in the off state to maintain in the off state.

7. A device for controlling a Vienna-like three-level circuit, comprising:

a detection unit configured to detect an inductor current of an inductor connected to each operating high-frequency bridge arm in the Vienna-like three-level circuit during a negative half cycle of an AC input voltage of the Vienna-like three-level circuit; and a control unit configured to, when an instantaneous value of the AC input voltage of the Vienna-like three-level circuit is greater than or equal to half of a DC output voltage of the Vienna-like three-level circuit, and when a freewheeling switch transistor on the high-frequency bridge arm to which the inductor is connected is in an on state, and when a main switch transistor on the high-frequency bridge arm is in an off state, control the freewheeling switch transistor in the on state to maintain in the on state and the main switch transistor in the off state to maintain in the off state if the detected inductor current does not reach a preset positive current, and control the freewheeling switch transistor in the on state to be turned off and the main switch transistor in the off state to be turned on if the detected inductor current reaches the preset positive current.

8. The device according to claim 7, wherein the control unit is further configured to determine that the instantaneous value of the AC input voltage of the Vienna-like three-level circuit is greater than or equal to half of the DC output voltage of the Vienna-like three-level circuit before controlling the freewheeling switch transistor in the on state to maintain in the on state and the main switch transistor in the off state to maintain in the off state.

\* \* \* \* \*